US008548831B2

(12) United States Patent
Serio

(10) Patent No.: US 8,548,831 B2
(45) Date of Patent: *Oct. 1, 2013

(54) SYSTEM AND METHOD FOR TRACKING, MONITORING AND REPORTING EXTINGUISHMENT OF A TITLE INSURANCE POLICY

(75) Inventor: Dianna L. Serio, Irvine, CA (US)

(73) Assignee: Corelogic Solutions, LLC, Santa Ana, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/194,502

(22) Filed: Jul. 29, 2011

(65) Prior Publication Data

US 2011/0282699 A1 Nov. 17, 2011

Related U.S. Application Data

(63) Continuation of application No. 12/166,051, filed on Jul. 1, 2008, now Pat. No. 8,015,037.

(51) Int. Cl.
*G06Q 40/00* (2012.01)

(52) U.S. Cl.
USPC .................................. 705/4; 705/30

(58) Field of Classification Search
USPC ...................... 705/4–44; 706/3–30
See application file for complete search history.

(56) References Cited

U.S. PATENT DOCUMENTS

| | | | | |
|---|---|---|---|---|
| 5,206,949 A | * | 4/1993 | Cochran et al. | 707/752 |
| 5,659,731 A | * | 8/1997 | Gustafson | 1/1 |
| 5,742,775 A | * | 4/1998 | King | 705/38 |
| 5,892,900 A | * | 4/1999 | Ginter et al. | 726/26 |
| 6,064,990 A | * | 5/2000 | Goldsmith | 705/75 |

(Continued)

FOREIGN PATENT DOCUMENTS

| | | | |
|---|---|---|---|
| EP | 1 067 492 A2 | * | 1/2001 |
| WO | WO 00/25251 | * | 5/2000 |
| WO | WO 00/46769 | | 8/2000 |
| WO | WO 2006/031626 | | 3/2006 |

OTHER PUBLICATIONS

"Trilegiant & MyPublicInfo Announce Partnership to Offer ID Theft Prevention Service", PR NewsWire, Oct. 12, 2005.*

(Continued)

*Primary Examiner* — Frantzy Poinvil
(74) *Attorney, Agent, or Firm* — Lempia Summerfield Katz LLC

(57) ABSTRACT

A system for monitoring a title insurance policy including a processor and a memory in communication with the processor is disclosed. The system includes computer readable logic stored on the memory and executable on the processor. The computer readable logic configured to receive a title record including both owner identification information and property identification information, query a title record database to determine if the received title record has experienced an extinguishment event selected from the group consisting of: a loan modification; a foreclosure; a sale; an arms-length ownership change; and a change to a real-estate owned (REO) property, set an inactive indicator associated with the title insurance policy if an extinguishment event is determined to be associated with the owner identification and property identification information of the title record, set, in the absence of an inactive indicator, an active indicator associated with the title insurance policy if an extinguishment event is not determined to be associated with the owner identification and property identification information of the title record, and generate, if the active indicator is set, a monitoring flag associated with the received title record associated with the title insurance policy of interest.

17 Claims, 3 Drawing Sheets

| Policy No. | Borrower's Policy Extinguished? | Lender's Policy Extinguished? | Monitor? |
|---|---|---|---|
| 1A – 12345 | X | X | N |
| 1B – 23456 | O | X | Y |
| 1C – 34567 | X | O | Y |

300

(56) References Cited

U.S. PATENT DOCUMENTS

| | | | |
|---|---|---|---|
| 6,306,803 B1* | 10/2001 | Tazaki | 508/539 |
| 6,393,387 B1* | 5/2002 | Adriaans et al. | 703/27 |
| 6,484,176 B1* | 11/2002 | Sealand et al. | 1/1 |
| 6,636,803 B1 | 10/2003 | Hartz et al. | |
| 6,721,728 B2* | 4/2004 | McGreevy | 1/1 |
| 6,871,140 B1* | 3/2005 | Florance et al. | 701/207 |
| 7,016,866 B1* | 3/2006 | Chin et al. | 705/26.7 |
| 7,028,052 B2* | 4/2006 | Chapman et al. | 1/1 |
| 7,054,841 B1* | 5/2006 | Tenorio | 705/57 |
| 7,181,465 B2* | 2/2007 | Maze et al. | 707/708 |
| 7,310,618 B2* | 12/2007 | Libman | 705/38 |
| 7,747,521 B2* | 6/2010 | Serio | 705/38 |
| 7,835,986 B2* | 11/2010 | Serio | 705/38 |
| 8,015,037 B2 | 9/2011 | Serio | |
| 2002/0049624 A1* | 4/2002 | Raveis, Jr. | 705/8 |
| 2002/0087460 A1* | 7/2002 | Hornung | 705/38 |
| 2002/0107703 A1* | 8/2002 | Feinberg et al. | 705/2 |
| 2002/0133371 A1* | 9/2002 | Cole | 705/1 |
| 2003/0050891 A1* | 3/2003 | Cohen | 705/42 |
| 2003/0105707 A1* | 6/2003 | Audebert et al. | 705/38 |
| 2003/0144948 A1* | 7/2003 | Cleary et al. | 705/38 |
| 2004/0024605 A1 | 2/2004 | Morris | |
| 2004/0128232 A1 | 7/2004 | Descloux | |
| 2004/0138995 A1 | 7/2004 | Hershkowitz et al. | |
| 2004/0230448 A1 | 11/2004 | Schaich | |
| 2005/0065874 A1 | 3/2005 | Lefner et al. | |
| 2005/0071376 A1 | 3/2005 | Modi | |
| 2005/0187863 A1 | 8/2005 | Whinery et al. | |
| 2005/0209873 A1 | 9/2005 | Anastasi | |
| 2005/0210068 A1 | 9/2005 | Szymanski et al. | |
| 2006/0080230 A1 | 4/2006 | Freiberg | |
| 2006/0178971 A1 | 8/2006 | Owen et al. | |
| 2006/0184374 A1 | 8/2006 | Long | |
| 2007/0282735 A1 | 12/2007 | Schuebert | |
| 2008/0281647 A1 | 11/2008 | Morris | |
| 2008/0281648 A1 | 11/2008 | Morris | |
| 2008/0281649 A1 | 11/2008 | Morris | |
| 2010/0004952 A1 | 1/2010 | Serio | |
| 2010/0106629 A1 | 4/2010 | Gilberti | |
| 2011/0035325 A1 | 2/2011 | Serio | |

OTHER PUBLICATIONS

Jay Romano, "Your Home; Holding a House Hostage," The New York Times, Aug. 22, 1999 (Hostage).

Joel Gross, "KnowX Helps Bridge the Small Business Information Gap," Business Credit, AllBusiness, Jun. 1, 1998 (KnowX).

KnowX—web.archive.org/web/20060113035726/http://www.knowx.com (2005) (KnowX).

Lisa Haarlander, "Stovroff Offers New Services to Home Buyers, Sellers," Jul. 17, 2001, Buffalo News, 2010 Factiva, Inc., pp. 1-2 (© 2001 Buffalo News. Provided by ProQuest Information and Learning).

Stovroff.com, http://web.archive.org/web/20020204061657/www.stovroff.com/default.cfm, "Stovroff Realty is Now RealtyUSA," Oct. 15, 2010.

"Six Florida Realtor Organizations Sign Multi-Year Agreements with Interealty; 30,000 Realtors Statewide to be Offered MLXchange, the Leading MLS Software System," Business Wire, Oct. 2, 2002, 2010 Factiva, Inc., pp. 1-2 (Copyright © 2002, Business Wire).

MLXchange Training Guide MLXchange, Version 1.4 (Copyright © 2003 Interealty Corp.), updated Sep. 5, 2003.

Sandra Block, "Guard Your Financial Info Doggedly," USA Today, http://www.usatoday.com/money/perfi/general/2005-06-30-protectx.htm, p. 1, Jun. 30, 2005.

Anne Kandra, "Browsing for Housing," Apr. 1999, PC World, pp. 193-197, 202, 204.

Elizabeth Razzi and Ronaleen R. Roha, "Search Long Enough and You Can Find Financial Web Sites That Will Knock Your Socks Off. We Did the Searching for You," www.$$$.com, Kiplinger's Personal Finance Magazine, Oct. 1996.

Michael Antoniak, Buyer's Guide, "Contact Management Software, Manage Your Customers List," Realtor Magazine, www.realtormag.com, pp. 48-51, Mar. 2001.

Michael Antoniak, Buyer's Guide, Net-Based Solutions, "Take It Online," Realtor Magazine, www.Realtor.org/realtormag, pp. 30-31, Jun. 2003.

Daniel Gooder Richard, "Real Estate Rainmaker Guide to Online Marketing," Chapter 8, "Capturing E-Leads from Your Website," pp. 113-117 (Copyright © 2004 by Daniel Gooder Richard).

Glenn R. Simpson, ProQuest, http://proquest.umi.com.libproxy.mit.edu/pdqweb?index=11&sid=1&src, The Wall Street Journal, "Big Brother-in-Law: If the FBI Hopes to Get the Goods on You, It May Ask ChoicePoint—U.S. Agencies' Growing Use of Outside Data Suppliers Raiser Privacy Concern—A Fugitive Rents a Mailbox," Apr. 13, 2001, p. A.1.

J.J. Luna, "How to Be Invisible," A Step-By-Step Guide to Protecting Your Assets, Your Identify, and Your Life, Copyright © 2000 by Editorial de Las Islas LC., Thomas Dunne Books.

Burney Simpson, An Unlikely Hit: Credit Scores, Collections and Recovery, Credit Card Management, Apr. 2002, 15, 1; ABI/INFORM Global, pp. 16, 18, and 20.

Gilberti, U.S. Appl. No. 11/712,833, filed Mar. 1, 2007.

Gilberti, U.S. Appl. No. 11/712,834, filed Mar. 1, 2007. (Abandoned).

Gilberti, U.S. Appl. No. 11/712,835, filed Mar. 1, 2007.

Gilberti, U.S. Appl. No. 11/712,836, filed Mar. 1, 2007. (Abandoned).

* cited by examiner

| Policy No. | Borrower's Policy Extinguished? | Lender's Policy Extinguished? | Monitor? |
|---|---|---|---|
| 1A – 12345 | X | X | N |
| 1B – 23456 | O | X | Y |
| 1C - 34567 | X | O | Y |

*FIG. 3*

| Active Policy | Policy Address | Liability Amount | Monitor? |
|---|---|---|---|
| 1A – 12345 | 10 State St. | $5,550 | N |
| 1B – 23456 | 20 Main St. | $2,500 | Y |
| 1C - 34567 | 30 Side St. | $3,350 | Y |

Number of Active Policy: 137
Reserve Amount Assoc. with Active Policies: $1,000,000

*FIG. 4*

| Active Policy | Policy Address | Policy Holder | Monitor? |
|---|---|---|---|
| 1A – 12345 | Unknown | Lender | N |
| Unknown | 20 Main St. | Borrower | Y |
| 1C - 34567 | 30 Side St. | Unknown | Y |

*FIG. 5*

SYSTEM AND METHOD FOR TRACKING, MONITORING AND REPORTING EXTINGUISHMENT OF A TITLE INSURANCE POLICY

RELATED APPLICATION

This patent document is a continuation of and commonly assigned U.S. patent application Ser. No. 12/166,051 filed on Jul. 1, 2008, now U.S. Pat. No. 8,015,037, the contents of which is hereby incorporated by reference for all purposes.

TECHNICAL FIELD

This patent relates to a system and method of tracking, monitoring and reporting status of a title insurance policy, and in particular a system and method for tracking and correlating property-related activities related to the termination and/or extinguishment of a title insurance policy.

BACKGROUND

Title insurance protects against losses related to the title and transfer of title of real property. Title insurance further protects against losses from the invalidity or unenforceability of mortgage liens against the real property. Title insurance may be employed and/or utilized as a potential defense against a lawsuit or allegations directed to the validity of the title associated with the real property. Typically the real property interests insured via a title insurance policy are fee simple ownership interests or a mortgage interest associated with the purchase of the real property.

Title insurance may be generally categorized as (a) owner's policies and (b) lender's policies. Owner's policies generally insure an owner of a real property that the title to the property is free from all defects, liens and encumbrances. Owner's policies may cover losses and damages suffered, often up to the purchase price of the property, if the title is unmarketable or otherwise proves to be defective. Lender's policies insure a mortgage lender and benefit the purchaser of the mortgage loan if the loan is sold and/or resold. Lender's policies facilitate the sale of mortgages into a secondary market.

Title companies, i.e., companies that specialize in issuing owner's policies and lender's policies, are required to maintain a monetary reserve to protect against policy claims. The larger the required monetary reserve, i.e., the larger the number of outstanding owner's policies and/or lender's policies, the less money the title companies have to invest and the less money that is available to provide new policies. Title companies use an actuarial method to estimate the amount that they need to set aside in reserve. Due to the volatility of this estimate, which potentially can be either too high or too low, the title companies are exposed to greater liability and, therefore, increases the likelihood that the title companies are not maximizing their financial reserves.

SUMMARY

The systems and methods disclosed herein provide for tracking, monitoring and reporting extinguishments relating to title insurance policies. In particular, the disclosed systems and methods may be configured to monitor the size of the monetary reserves for both an owner's title policy and a lender's title policy. It should be appreciated that the present invention may be used in tracking, monitoring and reporting for any type of title insurance. One of the objectives of the present invention, is to monitor and track various activities which may extinguish a title insurance policy and then report the results.

In one embodiment, a system for monitoring a title insurance policy including a processor and a memory in communication with the processor is disclosed. The system includes computer readable logic stored on the memory and executable on the processor. The computer readable logic configured to receive a title record including both owner identification information and property identification information, query a title record database to determine if the received title record has experienced an extinguishment event selected from the group consisting of: a loan modification; a foreclosure; a sale; an arms-length ownership change; and a change to a real-estate owned (REO) property, set an inactive indicator associated with the title insurance policy if an extinguishment event is determined to be associated with the owner identification and property identification information of the title record, set, in the absence of an inactive indicator, an active indicator associated with the title insurance policy if an extinguishment event is not determined to be associated with the owner identification and property identification information of the title record, and generate, if the active indicator is set, a monitoring flag associated with the received title record associated with the title insurance policy of interest.

In another embodiment, a computer-implemented method for monitoring a title insurance policy that is implemented by a processor configured to execute one or more computer readable instructions stored in a memory is disclosed. The method includes receiving a title record including both owner identification information and property identification information, querying a property record database, in response to the received title record, to determine if one of a stored plurality of property records corresponds to the information contained in the received title record, determining, if a corresponding title record is identified, whether the identified title record reflects the occurrence of an extinguishment event selected from the group consisting of a loan modification; a foreclosure; a sale; an arms-length ownership change; and a change to a real-estate owned (REO) property. The method is further discloses flagging the title insurance policy with an inactive indicator if an extinguishment event is determined to be associated with the owner identification and property identification information of the title record, flagging, in the absence of an inactive indicator, the title insurance policy with an inactive indicator if an extinguishment event is determined to not be associated with the owner identification and property identification information of the title record, and generating, if the active indicator is set, a monitoring flag associated with the received title record associated with the title insurance policy of interest.

In yet another embodiment, a system for monitoring a title insurance policy including a processor and a memory in communication with the processor is disclosed. The system includes computer readable logic stored on the memory and executable on the processor configured to communicate standardized title record information to a titled record database, query the title record database utilizing owner identification information and property identification information contained within the standardized title record information to determine of a corresponding title record stored in the title record database has undergone an event selected from the group consisting of: a loan modification; a foreclosure; a sale; an arms-length ownership change; and a change to a real-estate owned (REO) property, set an inactive indicator associated with the title insurance policy if one of the events is determined to be associated with the owner identification and property identification information of the title record, set, in the absence of an inactive indicator, an active indicator associated with the title insurance policy if none of the events are determined to be associated with the owner identification and property identification information of the title record, and generate, if the active indicator is set, a monitoring flag associated with the received title record associated with the title insurance policy of interest.

Other embodiments are disclosed, and each of the embodiments can be used alone or together in combination. Additional features and advantages of the disclosed embodiments are described in, and will be apparent from, the following Detailed Description and the figures.

BRIEF DESCRIPTION OF THE FIGURES

FIGS. 3, 4 and 5 illustrate reports that may be generated by an embodiment of the monitoring and tracking system disclosed herein.

DETAILED DESCRIPTION

Figure 1:
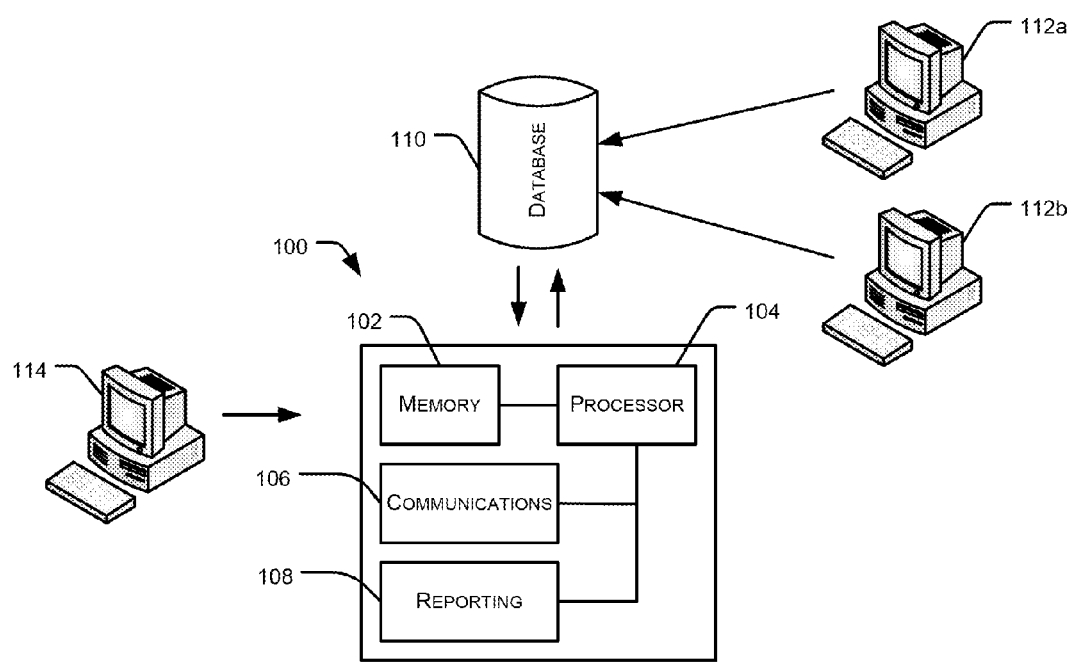
FIG. 1 illustrates an exemplary embodiment of monitoring and tracking system in accordance with the disclosure presented herein.

The present disclosure relates to systems and methods for tracking, monitoring and reporting the extinguishment of a title policy. For example, the present disclosure may be configured to detect activities which would cause a lender's title policy or an owner's title policy to extinguish. These activities may be known or common activities that extinguish and/or terminate a policy, or the activities may be predefined or user-determined events. In operation, the disclosed system and methods may be utilized to detect and notify when a title policy, whether an owner's or lender's policy, is extinguished (whether partially or fully) or terminated.

It should be appreciated that the present disclosure may be used for any type of title insurance. For example, the American Land Title Association (ALTA) type insurance policies, Error and Omissions Title insurance or any other type of title insurance policy. Also, it should be appreciated that the present disclosure searches for any property records which either extinguish or could potentially extinguish the title insurance policy. Property records may be any documentation relating to a specific property, whether recorded with a government entity or not, or a person. For example, property records may include deeds that are filed with local government agencies or even documents in non-governmental databases which would aid in determining whether the title insurance policy should be terminated or extinguished.

Before a search can be conducted to determine what relevant property records may be retrieved, the title company must provide some basic information so that a search can be conducted to retrieve all the relevant property records so that an assessment of the status of the title insurance policy may be determined. In the present application, the term "title record" is used to refer to such information. It should be appreciated that the "title record" may be specific information provided by the title company, e.g. owner's name, property address, liability amount, policy number, settlement date, or the "title record" may be a document which includes all the relevant information which the system would then extract the relevant information from the document, i.e. "title record", and store within the system. The more information the title company provides, the higher the likelihood that the relevant property records will be located.

The systems and methods disclosed herein provide for managing and monitoring the size of the title company's monetary reserves. In the exemplary embodiment, monitoring is based on detecting activities which post date the issuance of the title policy. Typically, when any one of a plurality of predetermined activities occurs, for example, an owner refinances their mortgage loan, sells the property or transfers the deed to the property, etc., the title insurance policy is "extinguished" or terminated. Extinguishing or terminating the title policy eliminates the liability of the title company and, in turn, removes the need for a monetary reserve in the amount of the now-extinguished or terminated mortgage loan. However, in many cases, the title company has no accurate or convenient way to identify or detect activities that would indicate that the title insurance policy has been extinguished.

Title companies may utilize actuarial techniques to estimate the amount that should be reserved. This results in the title companies maintaining a monetary reserve that is larger or smaller, e.g., covers more or too few title insurance policies that are actually active, than necessary. Therefore, these estimating techniques may expose the title companies to greater reserve volatility and therefore increase the likelihood that the company is not reserving the proper monetary amount. The present disclosure provides solutions to this problem, amongst others, by providing: (1) accurate information relating to events which extinguish or potentially extinguish the title policy; and (2) information that can be provided either in real-time or near real-time, based on the title company's preference and operational requirements.

The predetermined activities may include both activities related to the owner (as briefly discussed above) and activities related to the lender. For example, some lender activities that may lead to termination or extinguishment of a lender's title policy may include: (1) the loan being paid off; (2) a refinance by the borrower; (3) the property becomes an Real Estate Owned (REO) property or otherwise is foreclosed upon by the lender and/or sold by the trustee, sheriff, marshal or other agent of similar charge; and/or (4) if the title policy provides specific rules to extinguish the policy, e.g. a reverse-mortgage holder moves out of a house and is not the borrower-occupier. Alternatively, some owner activities that may lead to termination or extinguishing of an owner's title policy may include: (1) sale of a property, e.g. transfer of deed; (2) arms-length ownership change; and (3) REO. It should be appreciated that each one of the above-discussed predetermined activities may not conclusively indicate that both the policies have been "extinguished". For example, if an owner pays-off or otherwise satisfies their mortgage obligation, the corresponding lender's title insurance policy may be extinguished while the owner's title insurance policy may remain active and in force.

FIG. 1 illustrates one possible embodiment of a tracking or monitoring system 100 that may address the challenges discussed above. The system 100 may be embodied as computer readable instructions or logic stored on a memory 102. The memory 102 may, in turn, be in communication with a processor 104. The processor 104 may be configured to execute one or more of the computer readable instructions or logic stored in the memory 102.

A communication module or component 106 may be connected to the processor 104. Alternatively, the communication module 106 may be connected to both the processor 104 and the memory 102. The communication module 106 may be configured to communicate in a single mode or multiple modes. For example, the communication module 106 may include and RJ-45 jack for communication via a standard Ethernet 10/100 base-T system or any other wired network configuration or protocol. Alternatively, the communication module 106 may be configured for wireless communication over a wireless network (WiFi or WLAN) conforming to, for example, IEEE 802.11a, 802.11b . . . 802.11n and 802.11x standards. Wireless communications could also be accomplished via a cellular or other radio networks configured for various communication protocols such as, for example, an Evolution Data Only/Evolution Data Optimized (EVDO), a third generation (3G) mobile communication standard, and Wideband Code Division Multiple Access (WDMA) or any other known communication protocol or standard. Depending upon the needs and capabilities of the system 100, the communication module 106 may be configured to communicate via any one or more of these communication protocols and methods. The communication module 106 may, in turn, be utilized to communicate, transfer or otherwise transmit information such as an extensible markup language (XML) file via file transfer protocol (FTP), electronic mail, etc.

A reporting module or component 108 may be connected to the processor 104. Alternatively, the reporting module 108 may be connected to both the processor 104 and the memory 102. The reporting module 108 may be configured to utilize processed information provided by the processor 104 and/or stored information provided by the memory 106 to generate reports, messages or data files. These reports, messages or data files may be, for example, communicated via the communication module 106 or stored in the memory 102.

A database 110 may be connected to the system 100. The database 110 may be programmed to store and organize property records such as the sales and refinancing information for all of the real property within a given geographic location. It should be appreciated that property records may include both documents recorded with local government agencies or other types of records relating to a property transaction. For example, the database(s) may include information related to the loan application which are not recorded with the county or have not yet been filed with the county. The database 110 may be a First American CoreLogic™ database. For example, the database 110 may include title records or information such as the sales and financing information and financing status for all of the real property records within a sub-county, a county, a state, a region, a district, or nationally. Property records relating to financing information and financing status may include: assignments, satisfactions, modifications, defaults, auctions, REOs and other delinquency information. Financing information may include: information related to $1^{st}$ position, $2^{nd}$ position (or any later positions), purchase and non-purchase, reverse mortgage, loan type, interest rate, etc. In this way, whenever a real property is sold or the mortgage on a real property is assigned, refinanced or released, the database 110 may be updated to reflect this information.

The database 110 may be in communication with one or more terminals 112a, 112b. The terminals 112a, 112b represent data input sources which may communicate with and provide updates to the database 100. For example, the terminal 112a may provide direct access to the database 110 such that when a mortgage associated with a real property is updated, paid off, refinanced or in any way changed, the database 110 may be updated to reflect the change. In another example, the terminal 112b may represent indirect data sources which provide updates to the database in a scheduled manner such as, for example, daily, weekly, bi-weekly, etc. In this way, the database 110 can be kept up-to-date and thereby reflect the current status of any mortgage loan or any other document which is associated with an activity that would extinguish or terminate the title policy.

The terminal 114 may represent a title company which, as previously discussed, holds a plurality of title insurance policies relating, respectively, to real properties. However, it should be appreciated that each property may have one or more types of policies. The terminal 114 may communicate with the system 100 and the database 110 to determine the current status of any property records associated with a given real property. The current status of the property records may, in turn, be utilized to determine the status of a title insurance policy held by the title company. If the current status of the mortgage loan indicates that the real property has been sold, the mortgage refinanced or otherwise paid-off, the title company can adjust the monetary reserve to reflect the extinguishment of the title insurance policy.

In operation, the title company may provide, via the terminal 114, the system 100 and/or the database 110 various types of information that assists the service provider in locating documents which would be relevant to the extinguishment of the title policy. In on embodiment, the title company provides the title insurance policy address, the name or names of the owner associated with the mortgage loan and/or real property, the settlement date of the title insurance policy, and any other identification information. The provided information may be utilized to query the database 110. A matching property record or record of interest may be identified in response to the query. If the returned matching property record or record of interest indicates an activity has taken place which would extinguish the policy, e.g. that the mortgage loan associated with the real property has been sold, the mortgage refinanced or otherwise paid off, then the title company knows that the title insurance policy has been extinguished. The queries may be carried out in a batch format where multiple records such as, for example, all of the title insurance policies held by the title company, are submitted. This batch format may yield multiple records of interest relating to multiple title insurance policies that have been extinguished. Alternatively, the report could be provided in real-time so that the title company is immediately informed once an activity which terminates the title policy takes place.

Alternatively, a result or results from the query may be provided to the system 100. The system 100 may communicate the result to the report module 108. The report module 108 may generate a report that includes, for example, (1) the exact policies that have been extinguished (see FIG. 3) and (2) the amount that can be eliminated from the monetary reserve held by the title company (see FIG. 4).

Figure 2:
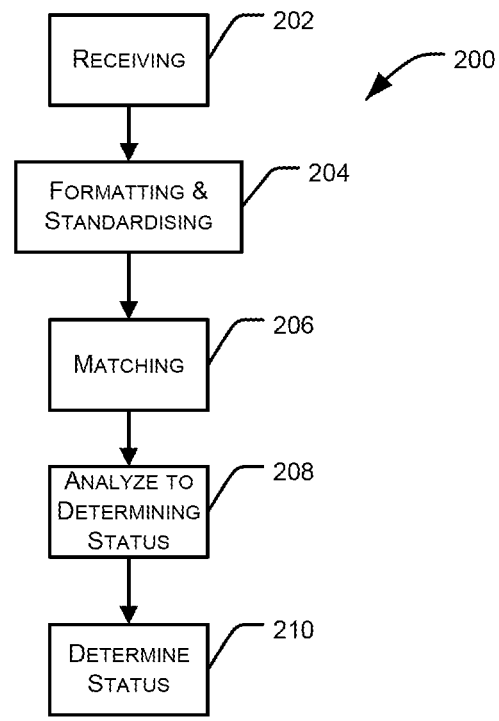
FIG. 2 illustrates a flowchart embodiment of the exemplary monitoring and tracking system shown in FIG. 1.

FIG. 2 illustrates a flowchart embodiment 200 of the exemplary monitoring and tracking system 100 shown in FIG. 1.

At block 202, the terminal 114 may communicate title policy information to the system 100. The system 100, in turn, receives the title policy information or title record that identified the real property of interest to the title company. It should be appreciated that the system 100 may obtain the title record information a number of ways which include, amongst others: (1) manual entered by the user; (2) information is extracted of documents; and/or (3) the information is sent in batch form or real-time to the system 100.

At block 204, the communicated title policy information is formatted and standardized so that the information may improve the accuracy of the search results. For example, for the address "8 Brookstone Street", Irvine, Calif., the system 100 may standardize the address to more accurately read "8 Brookstone, Irvine Calif. 92604". The formatted/standardized data may also be stored in the database 110.

At block 206, the system 100 matches property records within the database 110 which have the exact or similar information as provided title record provided by the title company. For example, if the title record provides that "Bruce Tabadoor" has a policy on "8 Brookstone Avenue", then the system 100 locates and matches all documents which have such information in the database 110. In an exemplary embodiment, the system 100 may search for specific document types, e.g. deeds, mortgage documents, mortgage release documents, etc. in order to locate more relevant information and expedite the search.

At block 208, the record of interest is analyzed to determine a status indicator. The status indicator identifies which portions, of the record of interest, have changed since the last query. In other words, the status indicator allows the title company or the reporting module 108 to determine if the mortgage has been paid off, sold or otherwise extinguished. It should be appreciated that their will be different analyses based on such factors as, amongst others, (1) if it is a lender's policy; (2) if it is an owner's policy; and/or (3) the predetermined rules set forth by the user.

At block 210, based on the information provided by the reporting module 108 or the status indicator, the title company many adjust the monetary reserve to reflect the extinguishment of the mortgage and the associated title insurance policy.

FIG. 3 illustrates a report 300 that may be generated to indicate the status of properties of interest to a title company. For example, the title company could provide the address information or other identification information and then the service provider (e.g. First American) could match the identification information to one or more records within the database 110. The report 300 may, in turn, be communicated to the requestor via an FTP website, email, etc. Each property or title may be assigned a status indicator for both the lender's title policy and the borrower's policy. For example, each policy may be identified with an "X" to indicate an extinguished or terminated policy and/or an "O" to indicate an active or open policy. The report 300 may further include an indication of whether the title policy has been flagged for continuous monitoring or periodic snapshot monitoring.

FIG. 4 illustrates another report 400 that may be generated based on the policy and/or property information such as, the property address and settlement date, borrower name, borrower social security number, property lot number, property tract number, loan amount, etc. The report 400 may indicate the total number of active or outstanding title policies based, for example, on information stored or accessible via the database 110. The report 400 may indicate the individual reserve amount associated with each policy, as well as a total reserve amount and amount in reserve associated with that property. The report 400 may further include an indication of whether the title policy has been flagged for further or continuing monitoring.

FIG. 5 illustrates another report 500 that may be generated to indicate the unmatched or orphaned properties held by the requestor. For example, if the requestor provides a list or group of policy and/or property information, all of the data may not correlate. In particular, there are a number of ways to match and monitor for extinguishment. Notwithstanding a spelling error or transcription error in any part of the list or group of policy and/or property information may or may not render correlation difficult. The report 500 may list the uncorrelated or match policies or properties and include an indication of whether the title policy has been flagged for further or continuing monitoring.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. A system for monitoring a title insurance policy including a processor and a memory in communication with the processor, the system comprising:
   computer readable logic stored on the memory and executable on the processor, the computer readable logic configured to:
   receive a title record including both owner identification information and property identification information;
   query a title record database to determine if the received title record has experienced an extinguishment event selected from the group consisting of: a loan modification; a foreclosure; a sale; an arms-length ownership change; and a change to a real-estate owned (REO) property;
   set an inactive indicator associated with the title insurance policy if an extinguishment event is determined to be associated with the owner identification and property identification information of the title record;
   set, in the absence of an inactive indicator, an active indicator associated with the title insurance policy if an extinguishment event is not determined to be associated with the owner identification and property identification information of the title record; and
   generate, if the active indicator is set, a monitoring flag associated with the received title record associated with the title insurance policy of interest.

2. The system of claim 1, wherein the title record database is configured to store a plurality of title records each of which is associated with a property record.

3. The system of claim 1, wherein the title record database comprises a plurality of individual databases in communication with each other via a network.

4. The system of claim 3, wherein at least one of the plurality of databases is configured to receive a title record update in a scheduled manner selected from a group consisting of: a daily update; a weekly update; a continuous update; and a real-time update.

5. The system of claim 1, wherein the title record further includes a settlement date of the title insurance policy and/or a liability amount.

6. The system of claim 1 computer readable logic is further configured to:
   generate of a report that includes each title record for which the monitoring flag has been set.

7. The system of claim 6, wherein the generated report further includes least the active indicator and an identification number associated with the title policy.

8. The system of claim 1 computer readable logic is further configured to:
   generate of a report that includes title records organized by active indicators and inactive indicators.

9. A computer-implemented method for monitoring a title insurance policy that is implemented by a processor configured to execute one or more computer readable instructions stored in a memory, the method comprising:
   receiving a title record including both owner identification information and property identification information;

querying a property record database, in response to the received title record, to determine if one of a stored plurality of property records corresponds to the information contained in the received title record;

determining, if a corresponding title record is identified, whether the identified title record reflects the occurrence of an extinguishment event selected from the group consisting of: a loan modification; a foreclosure; a sale; an arms-length ownership change; and a change to a real-estate owned (REO) property;

flagging the title insurance policy with an inactive indicator if an extinguishment event is determined to be associated with the owner identification and property identification information of the title record;

flagging, in the absence of an inactive indicator, the title insurance policy with an inactive indicator if an extinguishment event is determined to not be associated with the owner identification and property identification information of the title record;

generating, if the active indicator is set, a monitoring flag associated with the received title record associated with the title insurance policy of interest.

10. The method of claim 9 further comprising:
storing a plurality of title records each of which is associated with a property record in the property record database.

11. The method of claim 9, wherein querying property title record database further comprises querying a plurality of individual databases in communication with each other via a network.

12. The method of claim 11, wherein at least one of the plurality of databases is configured to receive a title record update in a scheduled manner selected from a group consisting of: a daily update; a weekly update; a continuous update; and a real-time update.

13. The method of claim 9, wherein receiving the title record further includes receiving the title record including a settlement date of the title insurance policy and/or a liability amount.

14. A system for monitoring a title insurance policy including a processor and a memory in communication with the processor, the system comprising:
computer readable logic stored on the memory and executable on the processor, the computer readable logic configured to:
communicate standardized title record information to a titled record database;
query the title record database utilizing owner identification information and property identification information contained within the standardized title record information to determine of a corresponding title record stored in the title record database has undergone an event selected from the group consisting of: a loan modification; a foreclosure; a sale; an arms-length ownership change; and a change to a real-estate owned (REO) property;
set an inactive indicator associated with the title insurance policy if one of the events is determined to be associated with the owner identification and property identification information of the title record;
set, in the absence of an inactive indicator, an active indicator associated with the title insurance policy if none of the events are determined to be associated with the owner identification and property identification information of the title record; and
generate, if the active indicator is set, a monitoring flag associated with the received title record associated with the title insurance policy of interest.

15. The system of claim 14, wherein the title record database is configured to store a plurality of title records each of which is associated with a property record.

16. The system of claim 14, wherein the title record database comprises a plurality of individual databases in communication with each other via a network.

17. The system of claim 16, wherein at least one of the plurality of databases is configured to receive a title record update in a scheduled manner selected from a group consisting of: a daily update; a weekly update; a continuous update; and a real-time update.

* * * * *